United States Patent
Lerman et al.

[15] 3,674,736

[45] July 4, 1972

[54] PROCESS FOR THE PREPARATION OF PIGMENTED POLYMER POWDERS OF CONTROLLED PARTICLE SHAPE AND SIZE AND SIZE DISTRIBUTION AND PRODUCT

[72] Inventors: Frank Lerman; Raymond C. Bartsch, both of Cincinnati, Ohio

[73] Assignee: National Distillers and Chemical Corporation, New York, N.Y.

[22] Filed: April 15, 1969

[21] Appl. No.: 816,403

Related U.S. Application Data

[63] Continuation-in-part of Ser. No. 557,641, June 15, 1966, Pat. No. 3,449,291.

[52] U.S. Cl. ................260/41 R, 106/308 Q, 252/62.1, 260/41 B, 260/41 C, 260/34.2, 260/2.5 R, 260/29.6 R, 264/5, 264/9, 264/15, 264/117
[51] Int. Cl. ...............G03g 9/02, C08f 45/08, C08f 45/14
[58] Field of Search...................106/308 Q; 260/41 R, 41 B, 260/41 C, 34.2, 29.6 EM, 2.5; 264/5, 9, 15, 117; 252/62.1

[56] References Cited

UNITED STATES PATENTS

| 3,326,848 | 6/1967 | Clemens et al. | 260/41 |
| 3,412,034 | 11/1968 | McIntosh et al. | 260/34.2 |
| 3,412,035 | 11/1968 | McIntosh et al. | 260/34.2 |
| 3,422,049 | 1/1969 | McClain | 260/78 A |

*Primary Examiner*—Theodore Morris
*Assistant Examiner*—H. H. Fletcher
*Attorney*—Allen A. Meyer, Jr.

[57] ABSTRACT

Pigmented polymer powders of average particle size less than 30 microns, which can be of uniform shape and in a narrow size distribution, are prepared by controlled heating, melting and agitation of a liquid dispersion of pigmented polymer in bulk or particle form in the presence of a surfactant or by controlled heating and agitating a liquid containing surfactant to which molten polymer is added. Pigmented powders can thus be obtained having spherical particles of very narrow size distribution approaching uniformity.

30 Claims, No Drawings

PROCESS FOR THE PREPARATION OF PIGMENTED POLYMER POWDERS OF CONTROLLED PARTICLE SHAPE AND SIZE AND SIZE DISTRIBUTION AND PRODUCT

This application is a continuation-in-part of Ser. No. 557,641, filed June 15, 1966, now U.S. Pat. No. 3,449,291, issued June 10, 1969.

This invention relates to a process for preparing pigmented polymers powders made up of pigmented particles of controlled shape, size and size distribution, which comprises forming a liquid dispersion of the pigmented particles in the presence of a surfactant, by heating the solid polymer in bulk or particle form to a temperature above the polymer melting temperature, or adding molten polymer to the liquid, then subjecting the dispersion to further heating under controlled temperatures and agitation so as to modify and control the particle surface configuration, size and size distribution. The invention also relates to the pigmented polymer powders thereby produced, made up of pigmented particles usually spherical in shape, of controlled particle size, and of narrow particle size distribution.

The availability of polymer powders in recent years has developed a number of industrial uses, and as the uses have become more highly refined, demand has arisen for powders consisting of particles uniform and preferably spherical in shape and in a controlled size and size distribution. Polymer powders are used to coat various types of particles, by dip-coating in a stationary or a fluidized bed of the powder, by powder coating (wherein the powder is applied by spraying or dusting), by flame spraying, and by electrostatic attraction. In these uses, the polymer powders are necessarily thermoplastic or in a thermoplastic stage of polymerization, since the melting of the powders is a necessary step in the adhesion of the particles to the base, and in the formation of a continuous coating film. Such polymer powders have also been applied in dispersed form as coatings by roller coating, spray coating, slush coating, dip coating, and electrostatic coating, to substrates such as metal, paper, paperboard, and the like.

These powders have also been employed in conventional powder molding techniques; as additives to waxes and paints and polishes; and as binders for nonwoven fabrics.

Electrostatic copying, duplicating, printing and gravure processes have opened new requirements for powders, consisting of black, white or colored particles of narrow size distribution and controlled size and having other physical, chemical, mechanical and electrostatic properties, for use as toners or inks in the dry form or suspended in liquid, and as developers for electrostatic coating processes, such as in the Xerox and Electrofax copying processes.

In these uses, it has become increasingly important that the particles of the polymer powder have consistent and stable properties, and be available in a controlled size and size distribution. Such particle properties are particularly desirable in specialized research studies, using the particles as aerosol tracers, as simulants, and as standards for study of chemical, biological, meteorological, and radioactive air dissemination, and for oceanography studies. It is therefore important to be able to prepare these materials by a process that is easy to carry out, and that is precisely duplicatable, so as to produce particles of controlled and standardized properties through a judicious selection of the polymeric material, additives, processing media, and process operating conditions.

Colored thermoplastic powders can be made by grinding coarse, colored thermoplastic cubes, pellets, etc., to the desired sizes. Such products, in varying particle sizes, can be made by incorporating pigments or dyes in a mixture or blend of resins which are subsequently passed through a high shear pulverizing device, and then size-classified on a shaker screen or in an air classifier. Grinding and size-classifying colored, bulk resins are expensive, requiring excessive power, close control, and special and expensive equipment. Even then, an appreciable part of the classified material is off-size and must be reprocessed, used for other purposes, or wasted. In addition, the particles thus produced are irregular and nonuniform in shape.

The surface of polymer particles can be coated with a coloring agent by conventional dyeing techniques. However, dyeing particles by coating them on the outside is a difficult procedure, and unless special care is exercised, the coating is nonuniformly distributed, and the material is tacky. Moreover, surface coatings can be removed by natural friction and abrasion during powder flow, or by solvents. Where color is added to the particles, uniformity of color distribution among and within the particles is important for overall uniform color effects of the powder, and/or of the products or coatings formed from it, or in particle detection, and in quantitative determinations in air dispersion and tracer studies. Particles should also be uniform in shape, and a uniform spherical shape contributes superior flow and fluidization characteristics, and improved dispersibility to the powders.

In some uses, it is important for the particles to have densities different from the polymer density. Density can be decreased by incorporation of foaming agents. Polymer density can be increased by incorporation of fillers. The polymer properties can be modified by incorporation of other polymer additives, and here also it is important that the additives be uniformly distributed in the polymer, so that the individual particles in addition to being of a uniform size and shape, will be uniform in the desired property.

The prior processes for preparing polymer powders from coarser forms, such as cubes, pellets, chips, flakes, granules, and the like, which forms usually are available commercially, are of three main types: (1) mechanical grinding to form coarse or fine powders, and (2) solution, and (3) dispersion, to form fine powders.

Coarse polymer powders are obtained mechanically grinding the coarser forms by passing them through a high shear pulverizing device, such as a Pallmann grinder, to yield particles of irregular shape, having diameters ranging from about 75 to about 300 microns. Such powders are not suitable for many applications, where spherical particles of the same, slightly larger or much finer size, sometimes desirably in a narrow size distribution, are necessary.

The ground powders are classified as to particle size on a shaker screen or in an air classifier. Grinding and size-classifying are expensive procedures, requiring excessive power, close control, and special and expensive equipment. Moreover, an appreciable part of the classified material is off-size, and must be reprocessed, used for other purposes, or disposed as waste. In addition, since the particles produced are irregular and nonuniform in shape, they are not entirely suitable for many applications, wherein spherical particles are preferred.

In the solution process, the polymer is dissolved in a solvent, and then precipitated from the solvent in finely divided form. The precipitation is accomplished by addition of a nonsolvent which is miscible with the solvent, and therefore rapidly reduces solubility of the polymer in the solvent; or by evaporation of the solvent to exceed the solubility of the polymer; or by a combination of the two precipitating methods. Emulsifying agents can be used, to aid in breaking down the size of the particles formed by such precipitation techniques. In these processes, there are difficulties in handling the solvent, and in completely removing the solvent from the polymer particles. Also, the resulting particles are in a wide size distribution, and must be classified, if particles of a narrow size distribution are desired. Also, the particles from these processes are of an irregular although somewhat rounded shape. This processing is costly, and not entirely satisfactory for many applications.

The dispersion process requires the suspension of the polymer is a liquid medium, with the aid of dispersing agents, after which the dispersion is subjected to high shear agitation. Water is generally the preferred dispersant, because of low cost and simplicity of operation. The usual dispersing agents are soaps, such as sodium stearate. In these processes, all or a portion of the dispersing agent must be incorporated into the polymer in a separate step preceding dispersion of the polymer in water. The polymer is then reduced to a molten condition, and the resulting molten mass is then dispersed in the liquid medium. The presence of the dispersing agent residues in the polymer generally creates undesirable changes in the polymer properties, for example, increased water sensitivity, reduced electrical resistivity, and other difficulties. Removal of these residues is, however, difficult, if not impossible. A further difficulty is that such dispersing agents tend to become inactive at elevated temperatures, as a result of which the operating temperature range is so low that only relatively low molecular weight polymers, such as low molecular weight polyethylene, are sufficiently fluid at such temperatures to be dispersible in water. These processes have therefore not been applicable to the preferred high melting thermoplastic polymer types. Also little control of particle characteristics are indicated in these processes.

Ser. No. 557,641, filed June 15, 1966, now U.S. Pat. No. 3,449,291, issued June 10, 1969, describes a process for obtaining colored polymer particles. A blend is formed of a polymeric material and a coloring agent, with or without other additives. This blend is introduced as coarsely subdivided solids, or as a hot liquid extrudate, into a vessel containing water and a suitable surfactant. The mixture is heated to or at a temperature above the melting point of the polymer blend, and then agitation is begun to convert the liquid mass of polymer to finely divided particles dispersed in the liquid. The dispersion is cooled, so as to solidify the particles, and the particles are then recovered.

In accordance with the present invention, a process is provided for preparing pigmented polymer powders of controlled particle size and size distribution, having consistent and stable physical, chemical, mechanical, electrostatic and aerodynamic properties. By judicious selection of the polymeric material, pigment, and any other additives; processing media; and operating conditions; it is possible to modify control and standardize the properties of the pigmented powder and the pigmented particles of which it is composed. Due to such control of the process, it is quite unnecessary to subsequently classify these powders for the desired average particle size and size distribution. The color can be uniformly distributed through the particles by compounding or preblending the bulk polymer with pigment, thus giving a uniform color effect which is stable and durable. The pigment may also be added to the powder as in dyeing. The pigmented particles are especially advantageous for electrostatic toner, developer and ink formulations, for use in the Xerox and Electrofax copying processes. The particles have a spherical or other regular shape, contributing superior powder flow and fluidization characteristics, a shorter melting time, improved dispersibility, and less variation in powder and particle characteristics, due to controlled particle shape, size, and size distribution.

In the process of this invention, a dispersion of pigmented polymer particles in an inert dispersing liquid is subjected to high shear agitation in two or more heating stages, of which at least one is (and preferably both are) at a temperature above the melting temperature of the polymer, in the presence of a surfactant, while maintaining the pigmented particles in particle form throughout, for a time sufficient to shape the particles, and maintain or change their size and/or size distribution. The resulting particle size may be the same as or larger or smaller than the starting particle size; the particle size distribution can also be narrowed or broadened. The pigmented particles are then cooled, so as to solidify them and stabilize them in that shape and size.

The dispersion of pigmented polymer particles can be obtained by any of several methods, of which the following are preferred:
1. feeding a liquid mass or extrudate of the pigmented polymer into the hot dispersion mixture;
2. heating the solid pigmented polymers in finely or coarsely subdivided form in the dispersing liquid through the melting point;
3. heating and agitating the solid pigmented polymer in finely or coarsely subdivided form in the dispersing liquid through the melting point.

By appropriate adjustment of the processing conditions, it is possible to control size and/or shape of the pigmented particles in any or in a combination of any of four ways:
1. to form the pigmented particles into a regular shape and surface configuration and preferably to spherize the pigmented particles, without change in size;
2. to further subdivide the pigmented particles to a smaller size, while at the same time forming them into a regular shape and surface configuration;
3. to coalesce the pigmented particles to give a more uniform size distribution, primarily by selectively coalescing and thus eliminating the smaller particles;
4. to agglomerate and/or coalesce the pigmented particles, so as to increase their size, while at the same time forming them into a regular shape and surface configuration.

By a combination of subdivision and selective coalescence, the size distribution can be controlled within an extraordinarily narrow range. It is therefore possible in accordance with the invention to produce powders particularly suitable for formulation into toners or inks in electrostatic copying, duplicating, printing, and gravure processes, having particle sizes of substantially within the range of from about 1 to about 30 microns, or, if preferred, within the range from about 1 to about 10 microns.

Geometric mean sizes and geometric mean deviation (GSD) are used to express particle size and particle size distribution in most of the Examples presented herein. Such usage is based on an assumed log normal distribution believed to best represent the particle distribution obtained in the processes of this invention. The minimum GSD value is unity, denoting that the particles are all the same size. The geometric mean size of a sample of particle is the $n$th root of the product of the individual particle sizes, where $n$ is the number of particles. The process of the invention is readily capable of producing pigmented polymer powders in a particle size distribution below GSD 1.5 and under carefully controlled conditions, GSD 1.4 or less.

The geometric mean size or particle diameter, that is, the geometric mean of the total number of particles, is called the number mean diameter (NMD). The geometric mean size whose weight (or volume) is the geometric mean weight (or volume) of the total particles is called the mean mass diameter (MMD).

In either case, for log normal distribution, 50 per cent of the material (number or mass) is greater than and 50 per cent is smaller than the geometric means size. Also, about 68.3 per cent of the material (number or mass) lies between the particle diameters of the mean size divided by the GSD value and the mean size multiplied by the GSD.

Thus, for an NMD of 10 microns: (1) for a GSD of 2, 68.3 percent of the number of particles would be within the size range of 10/2 and 10 × 2 or between 5 and 20 microns; (2) for a GSD of 1.5, 68.3 percent would be between 10/1.5 and 10 × 1.5 or between 6.7 and 15 microns; (3) for a GSD of 1.25, 68.3 percent of the number of particles would be between 8.0 and 12.5 microns.

Whenever average particle size is referred in this invention, it refers to the number mean diameter unless otherwise specifically designated.

Because of the large number of variables that can be controlled to affect the shape, size and size distribution of the particles, the process of the invention is of extraordinary versatility. For any given type of resin, it is possible so to adjust the operating parameters as to produce particles in a regular shape and surface configuration and of any size within the range from about 2 to about 20 microns, controlled within a very narrow size distribution. This is accomplished by selection of the appropriate group of process variables, and standardizing the process operating conditions to obtain the desired size and shape of particles. The very great versatility of the process at the same time introduces an element of uncertainty in the prediction of the effect of a given set of variables on a particular polymer without trial and experiment, simply because mathematical and physico-chemical computations are inadequate to accommodate these variables in a set of mathematical formulas or equations. The physical phenomena are extremely complex, involving shear forces, surface tension forces, van der Waal's forces, and cohesion and adhesion of soft particles, under conditions virtually impossible to measure or even evaluate. It is therefore necessary to establish the proper operating parameters for any given type of particle and type of polymer by trail and error experimentation. Such tests afford little difficulty, however, to one skilled in this art, and are easily carried out by taking into consideration the variables that affect particle size and size distribution. These variables are as follows:

PROCESSING PARAMETERS

1. Temperature
2. Degree and type of agitation
3. Duration of agitation

SYSTEM PARAMETERS

1. Type of polymer and pigment
2. Concentration of polymer in dispersion
3. Type of surfactant
4. Ratio of surfactant to polymer in dispersion
5. Number of stages in the process at which operation conditions vary
6. Other additives and adjuncts and their amount In the process of this invention, these process variables are applied to and controlled on a system of selected components of specified type and concentration, consisting essentially of a polymer, in which is incorporated one or more pigments, a surfactant and a liquid medium, to change or modify the pigmented polymer in its molten state to a desired particle size, shape and size distribution; and preserving these particle size and shape characteristics by cooling the polymer to its solid powder form.

The changes in polymer, shape, size and size distribution are the result of the interaction of the internal and surface forces of the components, especially the polymer, under the driving or deforming forces of the agitation. The selection of equipment and of type, intensity, and duration of agitation, as well as degree, rate and duration of heating and cooling, are determined by trial and error, though one skilled in the art can become experienced in equipment scale-up and in determining operating variables for new component systems to shortcut the number of trial and error attempts.

The theory and practice of dispersing, breakdown, and recombining of a liquid in another nonsolvent liquid, usually designated by the term "emulsification", is not fully understood even in simple systems. In a complex system such as in this invention, that involves in addition heating, cooling and other complicating operations, the theory is still far from clear, and requires further development by extensive experimentation.

However, a simplified physical explanation of the process is here proposed, avoiding inclusion of chemical and electrical and other complicating effects thought to occur in the system, such as special surfactant action on the polymer particle surfaces.

The forces of agitation, with the aid of surfactants, disperse solid or liquid particles of the polymer through the liquid medium, break down liquefied polymers (in the form of large globules of molten pellet and granulated polymers or coarse molten particles) into finer particles, as may be required for fine polymer powders. How the polymer material is deformed and broken down is considered later. The agitation can also drive particles into contact or close proximity, to cause the agglomeration of particles and their selective fusion into larger forms.

The temperature can change the state of the components, and modify the internal forces as well as the surface forces of the various components, to result in polymer changes. Factors influencing the components that are altered by temperature include viscosity and density. The temperature also affects the surface forces, particularly surface tension of the components.

The time intervals for the various steps of the process control the extent of the changes taking place in the polymer's state, form, shape, size and size distribution. The time duration extends or limits the effects of the predominating forces and of the variables acting to change the polymer.

The surfactant can be in liquid, solution or solid state, and may be agglomerated or dispersed in the liquid medium, depending on the temperature and agitation imposed, and on the type of surfactant. It tends to coat or interact physically, chemically or electrically with the resin surface, influencing the surface tension of the surfaces or interfaces. Thus, the surfactant affects the stability or ease of rupture of the polymer surface and helps determine the shape and particle sizes of the polymeric material.

Additives, including colorants such as pigments, can affect appreciably the process results, particularly when dispersed in the polymer. They modify the viscosity and density of the polymer. They uniformly or selectively distribute on the particle surface, to affect the surface tension, and the stability or ease of rupture of the polymeric material.

To accomplish the desired physical changes in the polymer, the process requires generally trial and error selection and combinations of types and concentrations of polymer, additives, surfactant and liquid medium (the last named is usually water, for practical reasons). Suitable equipment is used on the required production scale, to permit necessary operations on the component mixture, such as heating, agitating, holding and cooling for the proper intervals of time.

Agitation is normally required to disperse liquid or solid particles in nonsolvent liquid, and usually (except in very fine or stabilized dispersions) to keep them in the dispersed state. The dispersed particles tend to agglomerate and settle out, or in the case of liquid particles, to agglomerate and coalesce into increasingly larger liquid particles or masses. Surfactants are added to stabilize the dispersion. They may be said to coat the individual particles and to help them resist agglomeration and coalescence.

Spherical particles may be formed by heating irregularly shaped solid particles in dispersion above their melting or softening temperatures. When the particles become sufficiently fluid (their material viscosity lowered by increased temperature), the surface tension will tend to minimize the particle surfaces, thus producing spherical particles. This spherizing effect by surface forces overcoming internal forces may be counteracted by interface forces and by reduction of surface tension by the surfactant or at high temperatures. The effect is also influenced by the particle size, density, concentration and other variables of the components of the system, and by imposed forces such as agitation.

Vigorous agitation imposed on a system of nonsoluble liquids acts to break down the liquids into particle form, resulting in the dispersion of one of the liquids in the other. Which liquid is dispersed in the other depends on the materials, their concentrations, and their properties under the operating conditions of the system. Subdividing can be also accomplished by forcing a jet stream of one of the liquids into the other, with the breakdown of the stream into particles, of sizes depending on the velocity of the entering stream. Violent disturbances imposed on a mixture of the two liquids by agitation or other forces can cause excessive turbulence at the liquid interfaces, with "fingers" of one liquid entering the other, and breaking up into drops.

It is also believed that vigorous rotary agitation can draw out the more viscous liquid into elongated, rod-like or fiber shapes. These shapes are unstable, and under the action of surface tension form small drops at the terminals, or break down into large and fine drops. Likewise, larger drops can be elongated to break down into smaller drops by the deforming forces of agitation. Agitation and other imposed forces can also flatten drops into sheet-like forms, to break down into finer particles, or distort the drop into irregular shapes and break off finer drops.

It is generally considered that, in the various ways of subdividing liquids into particles, the more vigorous the agitation, the finer the resulting particles. This has not been always found true in forming particles by the process of the invention from polymeric materials. Above certain speeds, it was found that larger particles were formed. This might be explainable by breakdown of the viscous resin liquid to larger particles at higher rotational speeds, before the particle can be drawn out into fine threads, as at lower speeds, that break down into the finer particles. Agitation forces appear in many cases to subdivide more effectively the larger particles and the more viscous materials.

Also, increased temperature has been found, in many cases, to increase particle size in subdividing polymers, although it would appear that the less viscous liquids at the higher temperatures should break down more readily into finer particles because of the corresponding decrease in surface tension and viscosity. The polymer at the higher temperature may be too fluid to be drawn out into fine threads to form the finer particles. Also, coalescence of the finer particles into larger particles increases at the higher temperatures, due in part to decreased surface tension and viscosities.

The surfactant plays an important role in subdividing the polymers. On one hand, it may lower the surface tension at the polymer interface to permit ready breakdown into particles; on the other hand it stabilizes the particles formed by "coating" them. More surfactant is needed to form finer particles as there are increased surfaces to "coat".

Counter to dispersing and subdividing of the particles, as instigated by agitation, are the opposing actions of agglomerating and coalescing the particles, causing the particles in the dispersing medium to form clumps, larger particles or, in the limit, a single liquid mass. Agitation, gravitational effects, interparticle attraction and surface adherence bring two or more particles together in close proximity or contact. Under suitable conditions, the portion of the coating or surface films of the particles in contact will rupture; the liquids will merge, form a new surface film or "coating", and become a larger particle, that may become spherized. The larger particle may then further agglomerate, and merge with other particles, or be broken down and dispersed into smaller particles.

These unifying and separating actions on the particles can occur simultaneously, each action depending, to a greater or less degree, on the materials and their characteristics and on the operating conditions during processing. In general, increased polymer concentration, lower surfactant concentration, higher temperature, decreased agitation, and longer processing time aid agglomeration and coalescence. To control particle size and size distribution, the above mentioned and other variables must be closely set to optimum values, determined usually by trial and error, to accomplish the desired results. It has been found that to obtain particles of desired size within a very narrow size distribution (say less than 1.35 GSD), operating conditions, particularly temperature, agitation, and time, must be set to obtain molten polymer particles, somewhat smaller than those desired, dispersed in the liquid. Then the temperature is changed and agitation modified for a sufficient duration of time to allow the finer particles to coalesce with the larger, forming somewhat larger particles but with good size distribution. Too high temperatures for too long a time and under unsuitable agitation could cause formation of very large particles or actual liquid masses. The time and rate of cooling to solidify the polymer particles can affect the final particle shape, size and size distribution.

In producing spherical pigmented particles of controlled size and very narrow size distribution by the process of the invention, the operating conditions are set first for subdividing and dispersing, and then for agglomeration and limited coalescence. For best results, the conditions should be the optimum for each operation for the specific system to which they are applied, that is, the concentrations and types of components involved. For example, the surfactant type and concentration are effective to help form and stabilize the dispersed particles under one set of operating conditions; and yet, under a second set of conditions, they must permit the rupture of surface film or coating of the particles, and the stabilizing of the larger particles formed.

It is believed that surfactant concentration could be a determining factor in limiting the coalescence to an optimum size. The amount of surfactant could be insufficient to coat and stabilize the many finer particles with their total extensive surface but could be just adequate to coat the fewer, merged larger particles with their more limited total surface.

The term "melting temperature" as used herein refers to the temperature or temperature range at which a particle of the polymer first melts sufficiently to undergo a visual change in shape, such as rounding of corners (as in spherizing).

The spherizing temperature is the temperature at which surface tension overcomes the viscosity of the polymer, and pulls the particle surface into the form of a sphere. The temperature at which this occurs in any given system depends on the operating parameters outlined above, and particularly the size of the particle, its surface tension, and its viscosity, as well as the surfactant and the degree of agitation. The dispersion temperature is at least 5° up to 50°F. above the initial melting temperature of the polymer, and can be as high as 100°F. above the melting temperature, or higher, when spherizing is desired.

When reduction in particle size is desired, in addition, the dispersion temperature is at least 25°F. above the initial melting temperature of the polymer, usually at least 50°F. above the initial melting temperature of the polymer, and for polyethylene preferably is at least 70° to 175°F. above the initial melting temperature of the polyethylene. There is no upper limit, except as imposed by decomposition of the polymer or any other component. The temperature can accordingly be as high as 250°F. above the initial melting temperature of the polymer.

Thus, if the size of the particles is to be increased by agglomeration and/or coalescence, or the finer particles selectively removed by agglomeration and/or coalescence, the temperature should be generally at least 75°F. above the initial melting temperature of the polymer, preferably at least 100°F. above the initial melting temperature of the polymer, and can be as high as 150° to 400°F. above the initial melting temperature of the polymer. There is no critical upper limit, except as imposed by decomposition of the polymer or any component of the composition.

Taking these considerations into account, the actual operating temperatures, whether for particle size maintenance, reduction or increase, accordingly will be determined by the polymer melting temperature, and are within the overall range from the melting temperature up to as high as 500°F. or more. Preferably, the actual operating temperature is within the range from about 175° to about 450°F.

Coarse or fine powders or bulk polymer as cubes, granules, flakes, pellets or broken solid form once melted and sub-divided into liquid particle form must be kept dispersed in the liquid. Likewise, molten polymer fed into the hot liquid and sub-divided and dispersed by agitation must be retained in the molten particle form. The liquid particles once formed should not be permitted to become so fluid or the degree of agglomeration so great, that the pigmented polymer particles are fused into a mass, since this at once significantly reduces the ability to control particle size. This is prevented by control of operating temperature, polymer concentration, amount of surfactant, and agitation. It is important always to agitate the dispersed molten particles while at a temperature above their melting temperature, so as to prevent agglomeration and formation of a fluid polymer mass in the reaction vessel.

In conjunction with operating temperature, the degree of agitation (and its duration), and the liquid shearing action are also important. These are of course controlled by the mixing or agitating apparatus. Any type of mixing or agitating apparatus can be used that is capable of keeping the polymer in a dispersed state. There appears to be no particular type of agitation that is critical, but it is preferred that the device be capable of delivering at least a moderate amount of agitation to keep the particles in the dispersion. Where further particle subdivision is desired, the device should be capable of delivering adequate shearing action to the particles in the dispersion.

The degree of agitation is at least sufficient to maintain the particles in dispersion. If the particles be allowed to agglomerate into a fused mass, and so lose their identity, the process of the invention is frustrated, and its objectives cannot be fulfilled. The amount of agitation in excess of that needed to maintain the suspension is adjusted according to whether particles of the same or different sizes are desired.

In order to ensure a suitable particle dispersion and an appropriate shear action on the particles, so as to produce one or more of the change in shape, change in size, and change in size distribution, desired in accordance with the invention, agitator speeds within the range from about 100 to about 5,000 linear feet per minute are normally effective at suitable operating temperatures and other parameters. At speeds within the range from about 400 to about 4,000 linear feet per minute, the particles will be reduced in size, to a more finely divided form, providing operating conditions and material concentration, particularly of the surfactant are suitable. If agglomeration and/or coalescence of the particles is desired, and the operating parameters are such as to favor such coalescence or agglomeration, the agitator speed is normally within the range from about 200 to about 2,000 linear feet per minute. These ranges may be subject to adjustment, according to the agitator equipment and design, processing parameters, and the effectiveness of agitation. Consequently, these ranges are suggested as a guide, and are not intended to imply that speeds outside these ranges will not also be effective.

The time required for either reduction in particle size or increase in particle size at these or other agitator speeds depends upon the operating parameters and the polymer. In general, more finely divided particles are produced at times of from about 1 to about 24 minutes at the subdividing temperature, and agglomerated or coalesced particles are produced at from about 2 to about 60 minutes of agitation at the appropriate agglomerating or coalescing temperature. These times are suggestions, not limits.

An example of suitable equipment is a conventional autoclave, equipped with a conventional turbine type agitator. Agitators designed to impart shear to the mixture such as turbine-type rotors are highly effective in modifying the shape, average size, and size distribution of the polymer particles. The average particle size and size distribution for a particular polymeric material are influenced by the type of equipment, the agitation time and temperature, surfactant concentration, the stirring rate, and other operating and design factors of the agitating equipment. The particular conditions on a pilot or commercial plant scale can be determined for the equipment used by scaling up from laboratory scale by trial and error experiments.

Agitators that can be used are turbine type stirrers, either shrouded or open, with curved or straight blades, paddles with straight blades, marine propellers, and other types that can impart the required dispersion and liquid shear.

Another important parameter is the concentration of polymer in the liquid dispersion. In general, it can be said that low polymer concentrations, under operating conditions tending to reduce particle size, favor the production of small particles, while high polymer concentrations, under conditions tending to effect the agglomeration of particles, favor the production of larger particles. The polymer concentration can be varied widely, and is in no way critical. The polymer concentrations usually lie within the range from about 0.025 to about 50 percent, preferably from about 5 to about 30 percent.

Most polymers melt at elevated temperatures which may exceed the boiling point of the available inert dispersing fluids, particularly water. Consequently, it is usually necessary to carry out the dispersion under a pressure sufficient to maintain the liquid in the liquid phase. The absolute pressure in the system accordingly can range from 1 atmosphere to as much as 200 atmospheres, preferably within the range from about 4 to about 18 atmospheres. Some polymers may be sensitive to air oxidation at the elevated operating temperatures, in which case an inert gas atmosphere can be used, such as nitrogen, helium, hydrogen, carbon dioxide, argon, or krypton.

It is important to have surfactant present in all cases, in order to avoid the agglomeration of the molten particles into a large mass, that is, to ensure the dispersion of the polymer in finely divided form. For this purpose, usually at least about 0.05 and preferably 0.1 part by weight of surfactant per part of polymer is employed.

The amount of surfactant permits the formation of smaller size particles, and controlled coalescence or agglomeration, according to the other process parameters, if it is within the range from about 0.1 part to about 1 part by weight, per part of polymer. More than about 0.1 part of surfactant per part of polymer usually results in the formation of finely-divided particles having an average particle size less than about 30 microns.

The amount of surfactant need not exceed 2 parts per part of polymer.

Certain surfactants are more active than others. The preferred emulsifiers are nonionic, and have a water-insoluble nucleus of a polyoxyalkylene glycol other than ethylene glycol, with a molecular weight of more than 900, which has been extended with water-soluble polyoxyethylene groups at each end. The water-soluble portion of the molecule should constitute at least 50 percent by weight of the total. The polyoxyalkylene glycol can be aliphatic, aromatic or alicyclic in nature, can be saturated or unsaturated, and can be represented by the formula:

$$HO(C_2H_4O)_y(C_mH_nO)_x(C_2H_4O)_yH$$

wherein $x$, $y$, $m$ and $n$ are integers. When $(C_mH_nO)_x$ is saturated aliphatic, $n=2m$.

Compounds in this class are described in U.S. Pats. No. 2,674,619 to Lundsted, dated April 6, 1954 and U.S. Pat. No. 2,677,700 to Jackson et al., dated May 4, 1954.

The polyoxyalkylene compounds of U.S. Pat. No. 2,674,619 are defined by the formula:

$$Y[C_3H_6O)_n-E-H]_x$$

where
Y is the residue of an organic compound containing therein $x$ active hydrogen atoms,
$n$ is an integer,
$x$ is an integer greater than 1.
The values of $n$ and $x$ are such that the molecular weight of the compound, exclusive of E, is at least 900, as determined by hydroxyl number,
E is a polyoxyalkylene chain wherein the oxygen/carbon atom ratio is at least 0.5, and E constitutes at least 50 percent by weight of the compound.

The polyoxyalkylene compounds of U.S. Pat. No. 2,677,700 are defined by the formula:

$$Y(\overset{R_1}{\underset{R_3}{C}}-\overset{R_2}{\underset{R_4}{C}}-O)_nX$$

wherein:
Y is the residue of an organic compound containing therein a single hydrogen atom capable of reacting with a 1,2-alkylene oxide, $R_1$, $R_2$, $R_3$ and $R_4$ are selected from the group consisting of H, aliphatic radicals and aromatic radicals, at least one such substituent being a radical other than hydrogen, n is greater than 6.4 as determined by hydroxyl number and X is a water-solubilizing group which is nonionic and constitutes at least 50 percent by weight of the total compound.

The compounds of patent No. 2,674,619 are available commercially under the trademark "Pluronic." The following are examples of compounds corresponding to the above formula:

| Name | Molecular weight polyoxypropylene base | Ethylene oxide content in final product, weight percent | Molecular weight of final product |
| --- | --- | --- | --- |
| Pluronic F68 | 1,700 | 80 | 8,750 |
| Pluronic P75 | 2,050 | 50 | 4,100 |
| Pluronic F-98 | 2,700 | 80 | 13,500 |
| Pluronic F-108 | approx. 3,400 | 80 | 12,000–22,000 |

Other compounds in this class include ethylene oxide adducts of polyhydroxy alcohols extended with alkylene oxide, ethylene oxide adducts of polyoxyalkylene esters of polybasic acids, ethylene oxide adducts of polyoxyalkylene-extended amides of polybasic acids, ethylene oxide adducts of polyoxyalkylene extended alkyl, alkenyl and alkynyl aminoalkanols, of which the hydrophobic nucleus should have a molecular weight of at least 900 and the hydrophilic part of the molecule should be at least 50 percent by weight of the total. It is to be understood that the above-mentioned organic compounds having a plurality of active hydrogen atoms as well as the polyoxyalkylene glycols can be aliphatic, aromatic or alicyclic in nature and can contain unsaturation.

Such compounds can be of the following formulas ($m$, $n$, $x$ and $y$ are as above):

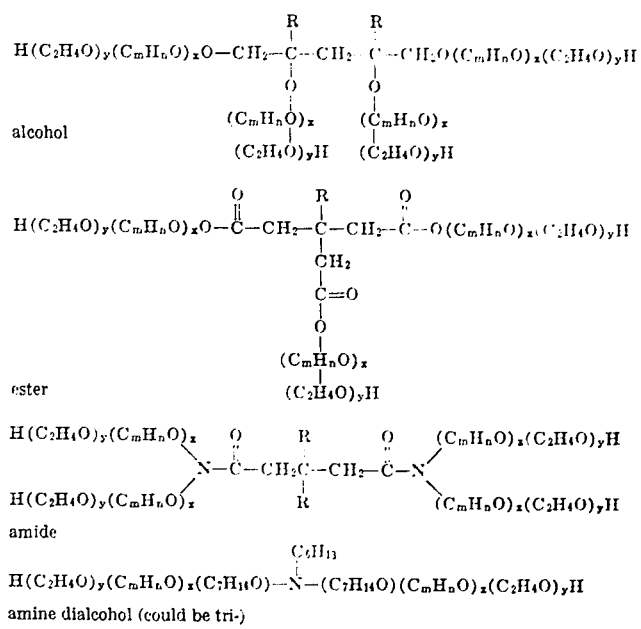

Another group of emulsifiers that can be employed has a water-soluble nucleus with a molecular weight of at least 900 containing an organic compound having a plurality of reactive hydrogen atoms condensed with an alkylene oxide other than ethylene oxide and having water-soluble polyoxyethylene groups attached to each end. The weight per cent of the hydrophilic portion of the molecule should be at least 50. This type of emulsifier is available commercially under the trademark "Tetronic." These ethylene oxide adducts of an aliphatic diamine such as ethylene diamine extended with propylene oxide have the following formula:

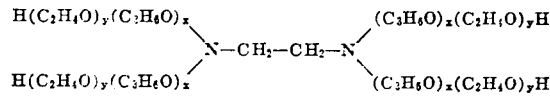

Compounds in this class are described in U.S. Pats. Nos. 2,674,619 and 3,250,719 and are available commercially under the trademark "Tetronic." The following are examples of compounds corresponding to the above formula:

| Name | Molecular weight for ethylene diamine-propylene oxide base | Ethylene oxide content in final product, weight percent | Molecular weight of final product |
| --- | --- | --- | --- |
| Tetronic 707 | 3,000 | 75 | 12,000 |
| Tetronic 908 | 4,050 | 85 | 27,000 |

A third group of nonionic emulsifiers that can be employed includes high molecular weight polyoxyethylene adducts of hydrophobic organic compounds having one active hydrogen, such as aliphatic, saturated or unsaturated alcohols having at least 18 carbon atoms; mono- or di-substituted alkyl, alkenyl or alkynyl aromatic or alicyclic alcohols of at least fifteen carbon atoms; monobasic aliphatic, saturated or unsaturated aromatic or alicyclic monobasic hydroxy acid derivatives such as N-alkyl, -alkenyl or -alkynyl amides or alkyl, alkenyl or alkynyl esters of at least eighteen carbon atoms; alkyl, alkenyl or alkynyl glycol monobasic acid esters of at least 18 carbon atoms; or di-N-alkyl, -alkenyl or -alkynyl (aromatic or alicyclic) aminoalkanols having at least 18 carbon atoms. The hydrophilic portion of these molecules should be at least 50 percent by weight of the total. Such compounds can have the following formulas ($m$, $n$, $x$ and $y$ are as above):

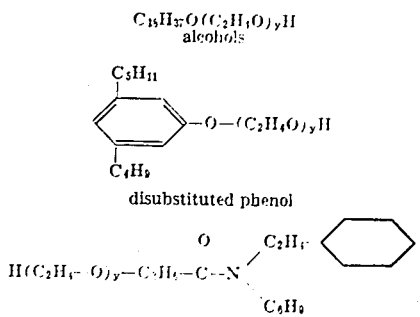

amide of hydroxy acid

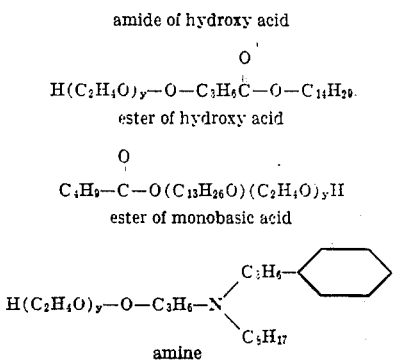

The process of the invention is normally carried out by forming a blend of the polymeric material and the coloring agents, with or without other additives.

The blend is fed in liquid form or as a liquid or flowable extrudate into the hot dispersion liquid containing surfactant, with or without agitation. The mass of polymer is then dispersed with agitation, under the conditions set out above for reducing it into particle form.

The blend can also be reduced to a coarse or fine sub-divided form. The polymer may be in bulk form such as granules, pellets, flakes, cubes, or other coarsely sub-divided solids, of 1/16 inch to average ¼ inch size. It may be in the form of coarse powders of 150 to 1,200 microns average size, or of fine powders below 150 microns average size. The mass or blend of solid polymer particles, a suitable surfactant, and the dispersing liquid, usually water, are then placed in the reactor. The mixture is then agitated, and gradually brought to the desired operating temperature, above the initial melting temperature of the polymer, and stirred at the desired speed and for the desired time. It is also possible to add the sub-divided solid polymer blend to the dispersing liquid, heat the mixture to melt the polymer, and then apply agitation to disperse it. After the polymer has been dispersed, the dispersion is subjected to the heating conditions of the invention to obtain the desired particle size, size distribution, and shape.

At the conclusion of the process, the dispersion is then cooled, while continuing the agitation, so as to resolidify the polymer particles, and stabilize their shape, size, and size distribution, after which the particles can be separated by filtration, or centrifuging, or by otherwise removing the liquid. Rapid cooling can be obtained by venting the reactor to reduce the pressure, thereby volatilizing some of the liquid. The powder can then be washed and dried.

The process is carried out in two or more stages, at different operating temperatures, and under different operating conditions. Such a process is particularly desirable from the standpoint of optimum control of shape, size and size distribution, even when applied to a molten mass or extrudate of polymer.

In the multi-stage process, the system is held at two or more different operating temperatures so as to control in separate steps (1) spherizing (2) particle size and (3) particle size distribution. The multi-stage process greatly increases the versatility of the process, and makes it possible to control particle size within an extremely narrow size distribution. It also expands the range of forms of polymer that can be used as a starting material.

A preferred first step, in a multi-stage process, especially when the form of starting polymer is in bulk form or in coarse particle size is a size reduction step. Such a step is effected under conditions that induce subdivision of the polymer into particles that are the same as or preferably smaller than the desired size.

A preferred second step is a particle agglomerating and/or coalescing step, that leads to elimination of fines and other smaller particles by consolidation with each other and with larger particles. Such a step can be carried out under conditions that favor agglomeration and/or coalescence, as set out heretofore. Usually, this step is carried out at a higher temperature, but in some cases agglomeration and/or coalescence are favored at a lower temperature than particle size reduction, where the particles coalesce during slow cooling of a dispersion thereof, after particle size reduction, under the conditions outlined heretofore.

A final step is spherizing the particles, but this can be combined with either the particle size reduction step or the agglomeration and/or coalescing step, whichever is the last or preceding step. Spherization also is effected under the operating conditions set out heretofore, and the temperature may be lower than in either the particle size reduction step or the agglomeration and/or coalescence step.

Each step of a multi-state process is complete when the desired change in particle shape, size, or size distribution has been accomplished. The time necessary for this is determined in accordance with the principles set out above for each type of operation.

In one example of a multi-stage process, in the initial first stage, the system temperature and agitation are held within selected operating ranges to reduce particle size. In the second stage, the system is held within a higher operating temperature and range and under suitable agitation that are selected to coalesce the particles under carefully controlled conditions, so as to reduce the particle size distribution to a very narrow range by eliminating fines. Thus, in the second stage of the process, the operating conditions are such that the more finelydivided particles are then coalesced so as to form the larger, more uniformly sized particles.

The following operating conditions can be used in a sequential two-stage subdividing and coalescing process for polyethylene types blended with pigments:

| | Stage One Subdividing | Stage Two Coalescing |
|---|---|---|
| Agitation, linear feet per minute | About 400 to 4000, preferably about 600 to 2000 | About 200 to 2000, preferably about 400 to 1200 |
| Duration of agitation, minutes | About 1 to 24, preferably about 2 to 8 | About 5 to 60, preferably about 10 to 30 |
| Temperature, °F. | About 50° to 200°F. above and preferably about 70° to 170°F. above melting point of polymer or blend | About 75° to 250°F. above, preferably about 100° to 200°F. above melting point of polymer or blend |

The process is applicable to any type of thermoplastic polymeric material, whether a truly thermoplastic material, or a thermosetting material in a thermoplastic stage of polymerization.

Exemplary polymeric thermoplastic materials are polyolefins, including both olefin homopolymers and copolymers, such as polyethylene, polypropylene, polyisobutylene, and polyisopentylene; polyfluoroolefins, such as polytetrafluoroethylene and polytrifluorochloroethylene; polyamides, such as polyhexamethylene adipamide, polyhexamethylene sebacamide, and polycaprolactam; acrylic resins, such as polymethylmethacrylate, polyacrylonitrile, polymethylacrylate, polyethylmethacrylate, and styrene-methyl-methacrylate; ethylene-methyl acrylate copolymers, ethylene-ethyl acrylate copolymers, ethylene-ethyl methacrylate copolymers, polystyrene, cellulose derivatives, such as cellulose acetate, cellulose acetate butyrate, cellulose propionate, cellulose acetate propionate, and ethyl cellulose; polyesters, such as polycarbonates; polyvinyl resins, such as polyvinyl chloride, copolymers of vinyl chloride and vinyl acetate, and polyvinyl butyral, polyvinyl alcohol, polyvinyl acetal, ethylene-vinyl acetate copolymers, ethylene-vinyl alcohol copolymers, and ethylene-allyl copolymers, such as ethylene allyl alcohol copolymers, ethylene-allyl acetate copolymers, ethylene allyl acetone copolymers, ethylene-allyl benzene copolymers, ethylene allyl ether copolymers, and ethylene-acrylic copolymers; and polyoxy-methylene.

Exemplary thermosetting materials in a thermoplastic stage of polymerization are phenol-formaldehyde, urea-formaldehyde, melamine-formaldehyde and alkyd resins, and polyesters.

The polymer used as a starting material can be of any size and form. One practical form is pellets. Exemplary forms of polymers are:

1. bulk polymers consisting of cubes, pellets, granules, flakes, and broken solids, 1/16 to ¼ inch size which may have coarse and fine powders mixed in;
2. coarse powders, generally mechanically ground in an average particle size range below 1,200 microns to as low as say 150 microns but often with a wide range of fine particles mixed in;
3. fine powders that may be obtained for certain polymers by mechanical grinding and classification, and which can be of average particle size of below 150 microns to as low as 1 micron;
4. sub-micron powders of less than 1 micron particle size.

When spherizing coarse powders and finer materials, the final polymer powder has particles of approximately the same average diameter, but with spherical surfaces. To change particle size, it is necessary to either subdivide or coalesce, or a combination of both, in sequential steps in a multi-stage process as described.

Various types of pigments can be incorporated with the polymer. Although pigments are referred to in this invention any other suitable colorant for the polymer can be used such as dye or opacifier, brightener or fluorescent agent, carbon black or white metallic oxide. All such colorants are implied collectively when pigment is referred to herein. The pigment should be heat-stable at the dispersion temperature, and should not react chemically with the polymer in a manner that is deleterious to the polymer or pigment, although it can react with the polymer in order to more firmly bond the pigment to the polymer. The pigment should preferably be light-stable, and should not leave or migrate from the resin during or after dispersion. Examples of suitable pigments include carbon black, phthalocyanine blue, fluorescent coloring agents or dyes, phthalocyanine green, cadmium sulfide, cadmium sulfide-selenide, titanium dioxide, calcined iron oxide, chromic oxide, and zinc oxide.

The concentration of pigment can be within the range from about 0.001 to about 1 part by weight per part of the pigmented polymer mixture. Usually, the concentration is within the range from about 0.005 to about 0.2 part, with the preferred proportion being from about 0.002 to about 0.15 part.

The amount of dispersing liquid to pigmented polymer can be within the range from about 1 to about 40 parts by weight of dispersing liquid per part of the polymer, with the preferred range being from about 2.5 to about 10 parts by weight. The amount and type of dispersing liquid are chosen according to the desired effect on particle size and distribution, according to the principles enumerated above.

As a dispersing liquid, water or a number of other inert liquids that do not dissolve the polymer at the dispersing temperatures could be used. Nonsolvents for polyethylene, even at elevated temperatures, include, in addition to water, aliphatic alcohols, acetic acid, acetone, diethyl ether, or glycerol, carbon disulfide and certain other vegetable oils. The liquid is a nonsolvent for the polymer, and in most cases a solvent for the surfactant used.

The pigmented polymer powders produced by the process of the invention have a very narrow particle size distribution when controlled coalescing temperatures are applied at some stage of the process (geometric standard deviations about 1.16 to about 1.5), and an average particle size of less than 30 microns, usually within the range from about 2 to about 20 microns.

The particles produced by the process of this invention are useful as standard spherical particles, in air dissemination studies; simulants for chemical, biological, radioactive, and aerosol dispersions, and oceanography tracer work; signal powders; colored, black and opaque white coatings for paper and textiles; dip coating of heated metal parts; and colored, black and opaque white toners in electrostatic printing, copying, duplicating and gravure processes.

The following Examples in the opinion of the inventors represent preferred embodiments of their invention:

EXAMPLE 1 a. A baffled, 2-liter, stainless-steel Parr-bomb reactor, equipped with three, air driven, 3 inch-diameter, six blade turbine rotors, was used. The bottom of the reactor was fitted with a ½ inch ball valve and discharge line, for quick venting and cooling of the liquid polymer particle dispersion. The reaction assembly was inserted in a small electric furnace for heating.

A blend was prepared of 10 percent by weight "Supercarbovar" carbon black compounded with NA-250 "Petrothene" a polyethylene of 0.926 actual density, melt index of 250 and melting point of about 235°F. This blend was granulated into a bulk material of from ¼ inch size pieces down to fine powder size. A charge of 201 grams of this bulk material was fed into a reactor containing 201 grams of Pluronic F-108 surfactant, and 938 grams of water. The charge was heated while stirring to about 288°F., and held at that temperature with stirring at 1,250 linear feet per minute (LFPM) for about 4 minutes. The charge was then rapidly discharged and cooled. The particles formed were rounded, but of irregular, elongated and oval shapes, with a number mean diameter (NMD) of 8.68 microns, and a geometrical standard deviation (GSD) of 1.42. Their particle size was thus reduced, but the shape was not spherical.

b. When procedure a) was repeated except that the surfactant was Pluronic F-98, the particles formed were spherical, with an NMD of 11.29 microns and a GSD of 1.81. This shows the influence of the surfactant type.

c. Procedure a was followed except that after about 4 minutes at 288°F. the dispersion was heated with stirring for 34 minutes, to a temperature of 392°F. maximum. The spherical particles had an NMD of 18.04 and a GSD of 1.25. Comparison with a shows that the second stage of heating and stirring gave some coalescence of the particles, resulting in a larger particle size, a spherical shape, and greater size uniformity.

EXAMPLE 2

Into the 2-liter Parr bomb reactor, as described in Example 1, were charged 201 grams of a carbon black pigmented polyethylene in bulk granulated form, 201 grams of Pluronic F-108 surfactant, and 938 grams of water. The pigmented polyethylene was a blend of 10 percent by weight "Supercarbovar" carbon black compounded into NA-250 "Petrothene'', a polyethylene of 0.926 actual density, melt index of 250 and melting point of about 235°F. This blend was granulated into a bulk material of ¼ inch size pieces down to fine powder size. The charge was heated while stirring to about 288°F., and held at that temperature with stirring at 1,250 linear feet per minute (LFPM) for about 4 minutes. After four minutes with stirring at 288°F., the dispersion was further heated in a second stage with continued stirring at 1,250 LFPM for 27 more minutes, until a temperature of 392°F. was reached, and then rapidly discharged and cooled; the particles were spherical of NMD 13.72 microns and GSD 1.24. Comparison with procedure 1 a shows the improvement in GSD by the second stage heating.

EXAMPLE 3 a. Example 2 was repeated except that the dispersion was heated in a second stage with stirring for 22 minutes, to reach a maximum temperature of 356°F., before discharging and cooling. Oval-shaped particles were produced that had an NMD of 14.13 microns, and a GSD of 1.54. The lower second stage temperature and shorter heating time gives a broader size distribution.

b. When procedure a was followed, with second stage maximum temperature 374°F., and stirring time 28 minutes, the NMD was 12.17 and GSD 1.48. The lower temperature caused a broader particle size distribution than in Example II.

EXAMPLES 4 to 25

In a series of 22 experiments, into the 2-liter Parr bomb reactor, as described in Example 1, were charged 201 grams of a blend of 10 percent "Supercarbovar" carbon black, compounded into NA-250 "Petrothene", granular polyethylene, with particles ¼ inch in diameter or less, actual density 0.926, melt index 250, 201 grams of Pluronic F-108 surfactant, and 938 grams of water. The dispersions were then subjected to the second stage heating and agitation times shown in the Table below. The maximum second stage temperature reached in each run was 392°F. The NMD and GSD size analyses are given in the Table. All show a narrow size distribution of 1.35 or lower, not attainable without the second stage heating and agitation.

TABLE I

| Example No. | Second Stage Time (Minutes) | NMD (Microns) | GSD |
|---|---|---|---|
| 4 | 27 | 8.54 | 1.32 |
| 5 | 26 | 8.23 | 1.33 |
| 6 | 31 | 9.80 | 1.29 |
| 7 | 28 | 9.03 | 1.29 |
| 8 | 27 | 10.53 | 1.24 |
| 9 | 27 | 11.85 | 1.26 |
| 10 | 26 | 12.21 | 1.25 |
| 11 | 29 | 13.31 | 1.28 |
| 12 | 38 | 9.40 | 1.20 |
| 13 | 42 | 17.70 | 1.20 |
| 14 | 34 | 16.94 | 1.29 |
| 15 | 33 | 17.91 | 1.19 |
| 16 | 41 | 17.46 | 1.25 |
| 17 | 28 | 17.68 | 1.35 |
| 18 | 22 | 15.97 | 1.33 |

It is apparent that using a two-stage process, the first stage under conditions such that the particles are subdivided, and the second stage under conditions such that the particles are coalesced, it is possible to obtain powders in small particle sizes and in narrow size distribution.

EXAMPLE 19

The effect of a two-stage heating process on particle size and size distribution, vis-a-vis a single stage heating under comparable conditions, is demonstrated in a direct comparison.

a. Into the 2-liter Parr bomb reactor, as described in Example 1, were charged 201 grams of a blend of 10 percent "Supercarbovar" carbon black, compounded into NA-250 "Petrothene", granular polyethylene, with particles ¼ inch in diameter or less, actual density 0.926, melt index 250, 201 grams of Pluronic F-108 surfactant, and 938 grams of water. The charge was heated while stirring to about 392°F., and held at that temperature with stirring at 1,250 linear feet per minute (LFPM) for about 6 minutes. The charge was then vented to the atmosphere. The powder recovered was composed of spherical particles, NMD 19.87, GSD 1.51.

b. Procedure a was repeated, except that the charge was brought to 287°F., held there 6 minutes, and then vented to the atmosphere. The spherical particles had an NMD of 8.98 and a GSD of 1.87.

Comparison of a and b shows that at the higher temperature, coalescence takes place, producing larger particles, in a better size distribution.

c. Procedure b was repeated, except that after six minutes at 287°F., the charge was heated to 392°F. over 30 minutes, and then vented. The spherical particles had an NMD of 7.28 and a GSD of 1.31. Thus, in the two stage heating, the particles obtained are of small size and have a very narrow size distribution.

Having regard to the foregoing disclosure, the following is claimed as the inventive and patentable embodiments thereof:

1. A process for preparing pigmented polymer powders, containing from about 0.001 to 1 parts by weight of pigment, of fine particles of controlled shape, and of size and size distribution controlled to an average diameter within the range of from about 1 to 30 microns and at a GSD of less than 1.5, comprising subjecting the pigmented polymer in from about 1 to about 40 parts per 1 part of polymer of an inert dispersing liquid which is a nonsolvent for said polymer in the presence of from about 0.05 to 2 parts by weight per part of polymer of a nonionic surfactant to heating and agitation in at least two stages above the melting temperature of the polymer but below the decomposition temperature of any component for times sufficient to form and/or size particles thereof and, while maintaining the particles in particulate form, to modify and control their sizes and shape at less than 30 microns average diameter and size distribution of less than 1.5 GSD, whereby about 68.3 percent of said particles are within a size range determined by the particle diameters of the mean size divided by the GSD value and the mean size multiplied by the GSD value; and then cooling the particles to solidify them and stabilize them in that shape, average size and size distribution.

2. A process according to claim 1 in which the pigmented polymer is added as a molten mass to a hot inert dispersing liquid containing the surfactant and is sub-divided into particle form by heating and agitation as a first stage, and modifying and re-sizing the particles in subsequent stage or stages.

3. A process according to claim 1 in which the pigmented polymer is in solid bulk or particle form in the dispersing liquid and is heated above its melting point to form a mass that is sub-divided by agitation into particle form, and modifying and controlling the size of the particles in subsequent stages.

4. A process according to claim 1 in which the pigmented polymer is in solid particle form in the dispersing liquid and is heated with agitation to above its melting point without losing its particulate form and is further heated and agitated with or without sub-dividing to modify and control the size of the particles in subsequent stages.

5. A process according to claim 1 in which the average size is controlled within the range from about 1 to about 10 microns, and the GSD at less than 1.4.

6. A process according to claim 1 in which the average size is controlled within the range of about 10 to about 20 microns and the GSD is less than 1.35.

7. A process according to claim 1 in which particle size is controlled by heating the pigmented polymer in the inert liquid in at least one stage at a temperature within the range from about 100° to about 500°F.

8. A process according to claim 1 in which particle size is controlled by control of the degree of agitation in at least one stage within the range of from about 100 to about 5,000 linear feet per minute.

9. A process according to claim 1 in which particle size is controlled by control of the concentration of polymer in the dispersion within the range of from about 2.5 to 10 parts of dispersing liquid to one part of polymer.

10. A process according to claim 1 in which particle size is controlled by control of the amount of surfactant in the dispersion within the range of from about 0.1 to about 1 parts per part of polymer.

11. A process according to claim 1 in which particle size and size distribution are controlled by separation of the process into at least two stages at different dispersion temperatures, each at or above the melting temperature of the polymer.

12. A process according to claim 1 in which particle size is controlled in an initial heating stage so as to sub-divide the pigmented polymer to a small particle size by maintaining the dispersion temperature at at least from about 50°F. to about 250°F. above the melting temperature of the polymer, and then, in a subsequent heating stage, particle size is controlled so as to agglomerate and coalesce the particles, and increase their size and narrow their size distribution, while at the same time forming them into a regular shape and surface configuration, by maintaining the dispersion at a higher temperature of at least from about 75°F. to about 500°F. above the melting temperature of the polymer.

13. A process according to claim 1 in which the polymer is a thermoplastic synthetic resin.

14. A process according to claim 13 in which the polymer is polyethylene.

15. A process according to claim 13 in which the polymer is a methacrylate-styrene copolymer.

16. A process according to claim 1 in which the polymer is an ethylene copolymer.

17. A process according to claim 1 in which the polymer is an ethylene-vinyl acetate copolymer.

18. A process according to claim 1 in which the surfactant is a nonionic polyoxyalkylene glycol surfactant.

19. A process according to claim 1 in which the surfactant is a polyoxyethylene oxypropylene glycol block copolymer surfactant.

20. A process according to claim 1 in which the pigment is a white metal oxide.

21. A process according to claim 1 in which the pigment is carbon black.

22. A process for preparing finely divided pigmented polymer powders, containing from about 0.001 to 1 part by weight of pigment, having controlled particle size and/or shape and/or size distribution, comprising agitating a molten pigmented polymer in from about 1 to about 40 parts per part of polymer of an inert dispersing liquid which is a nonsolvent for said polymer in the presence of from about 0.05 to 2 parts by weight per part of polymer of a nonionic surfactant at a first temperature from at least about 50°F. to about 250°F. above the melting temperature of the polymer for a time sufficient to form finely divided pigmented polymer particles dispersed in the liquid, and then in a second stage heating the dispersion with agitation at a second temperature above the melting temperature of the polymer but below the decomposition temperature of any component and different from the first temperature for a time sufficient to shape the particles, and control their average size to within the range of from about 1 to about 30 microns, and narrow their size distribution to less than 1.5 GSD, whereby about 68.3 percent of said particles are within a size range determined by the particle diameters of the mean size divided by the GSD value and the mean size multiplied by the GSD value, and then cooling the pigmented particles so as to solidify them and stabilize them in that shape, average size and size distribution.

23. A process according to claim 22 in which the size distribution is controlled within the average size range from about 1 to about 10 microns, at less than 1.4 GSD.

24. A process according to claim 22 in which the size distribution is controlled within the average size range of from about 10 to about 20 microns at less than 1.35 GSD.

25. A process according to claim 22 in which the particles are brought to a spherical shape and surface configuration.

26. A process according to claim 22 in which particle size is controlled by heating the dispersion in a first stage at a temperature within the range from about 100° to about 175°F., and in a second stage at a temperature within the range from about 150° to about 250°F.

27. A process according to claim 22 in which particle size is controlled by control of the degree of agitation within the range of from about 100 to about 5000 linear feet per minute.

28. A process according to claim 22 in which particle size is controlled by control of the concentration of polymer in the dispersion within the range of from about 2.5 to 10 parts of dispersing liquid to 1 part of polymer.

29. A process according to claim 22 in which particle size is controlled by control of the amount of surfactant in the dispersion within the range of from about 0.1 to about 1 parts per part of pigmented polymer.

30. A process according to claim 22 in which particle size is controlled in the second stage by maintaining the dispersion temperature at at least about 75°F. up to about 500°F. above the melting temperature of the polymer.

* * * * *